(12) United States Patent
Deutmeyer

(10) Patent No.: US 11,502,380 B2
(45) Date of Patent: Nov. 15, 2022

(54) PRODUCING A RECHARGEABLE BATTERY

(71) Applicant: Monbat New Power GmbH, Nordhausen (DE)

(72) Inventor: Michael Deutmeyer, Hamburg (DE)

(73) Assignee: Monbat New Power GmbH, Nordhausen (DE)

( * ) Notice: Subject to any disclaimer, the term of this patent is extended or adjusted under 35 U.S.C. 154(b) by 228 days.

(21) Appl. No.: 16/628,079

(22) PCT Filed: Jun. 25, 2018

(86) PCT No.: PCT/EP2018/066863
§ 371 (c)(1),
(2) Date: Jan. 2, 2020

(87) PCT Pub. No.: WO2019/007722
PCT Pub. Date: Jan. 10, 2019

(65) Prior Publication Data
US 2020/0176749 A1    Jun. 4, 2020

(30) Foreign Application Priority Data

Jul. 3, 2017   (DE) .......................... 102017006229.3

(51) Int. Cl.
*H01M 50/538* (2021.01)
*B23K 26/24* (2014.01)
(Continued)

(52) U.S. Cl.
CPC ........... *H01M 50/538* (2021.01); *B23K 26/24* (2013.01); *H01M 10/0422* (2013.01);
(Continued)

(58) Field of Classification Search
CPC ........... B23K 2101/36; B23K 26/0876; B23K 26/24; B23K 26/244; H01M 10/0422;
(Continued)

(56) References Cited

U.S. PATENT DOCUMENTS 7,364,817 B2   4/2008   Lee
8,007,549 B2   8/2011   Ligeois et al.
(Continued)

FOREIGN PATENT DOCUMENTS

CN   204834764 U   12/2015
DE   102 50 839 A1   5/2004
(Continued)

OTHER PUBLICATIONS

Dmitrij Walter, et al., "Nothing Less Than More Affordable Lithium-Ion Batteries—A new laser welding process as an even smarter way of making bonds," Laser Technik Journal, Apr. 2014, Wiley-VCH Verlag GmbH & Co. KGaA, Weinheim.
(Continued)

*Primary Examiner* — Victoria H Lynch
(74) *Attorney, Agent, or Firm* — Muirhead and Saturnelli, LLC

(57) ABSTRACT

A rechargeable battery is produced by welding a metal foil to a contact element to make electrical contact with an electrode of the rechargeable battery. An edge region of the metal foil is brought into contact with a first surface of the contact element and welded to the contact element by applying a laser beam to a second surface of the contact element. The second surface being averted from (opposite to) the first surface of the contact element. The metal foil and further planar constituents of the rechargeable battery are wound to provide the rechargeable battery with an at least essentially cylindrical design. The contact element-is oriented at right angles to the metal foil.

18 Claims, 4 Drawing Sheets

(51) Int. Cl.
  *H01M 10/04* (2006.01)
  *H01M 10/0525* (2010.01)
  *B23K 101/36* (2006.01)

(52) U.S. Cl.
  CPC ... *H01M 10/0431* (2013.01); *H01M 10/0525* (2013.01); *B23K 2101/36* (2018.08)

(58) Field of Classification Search
  CPC ......... H01M 10/0431; H01M 10/0525; H01M 50/538; H01M 50/543; Y02E 60/10; Y02P 70/50
  See application file for complete search history.

(56) References Cited

U.S. PATENT DOCUMENTS

| | | | |
|---|---|---|---|
| 9,136,538 B2 | 9/2015 | Byun et al. | |
| 2005/0202319 A1 | 9/2005 | Kim | |
| 2008/0026291 A1 | 1/2008 | Kim | |
| 2008/0305393 A1 | 12/2008 | Nakai et al. | |
| 2014/0087226 A1 | 3/2014 | Mishiro et al. | |
| 2018/0021888 A1* | 1/2018 | Liu ..................... | B23K 26/22 219/121.64 |
| 2018/0123109 A1 | 5/2018 | Pouget et al. | |

FOREIGN PATENT DOCUMENTS

| | | |
|---|---|---|
| DE | 10 2004 012 476 A1 | 10/2005 |
| DE | 600 33 678 T2 | 12/2007 |
| DE | 11 2009 003 624 T5 | 5/2012 |
| DE | 10 2012 008 940 A1 | 11/2013 |
| EP | 1 596 449 A2 | 11/2005 |
| EP | 1 223 592 B1 | 2/2007 |
| EP | 2 045 854 A2 | 4/2009 |
| EP | 2 061 106 A1 | 5/2009 |
| EP | 2 249 416 A1 | 11/2010 |
| EP | 3 316 350 B1 | 1/2020 |
| JP | 2004-247192 A | 9/2004 |
| JP | 2008-066075 A | 3/2008 |
| JP | 2008-305731 A | 12/2008 |
| JP | 2009-123438 A | 6/2009 |
| JP | 4326818 | 9/2009 |
| JP | 2012-086254 A | 5/2012 |
| JP | 2015-047625 A | 3/2015 |
| WO | WO 2010/065378 A1 | 6/2010 |
| WO | 10 2012 018 129 A1 | 3/2014 |

OTHER PUBLICATIONS

Press Release of company Manz AG, Steigackerstr. 5, 72768 Reutlingen, Oct. 14, 2016.

* cited by examiner

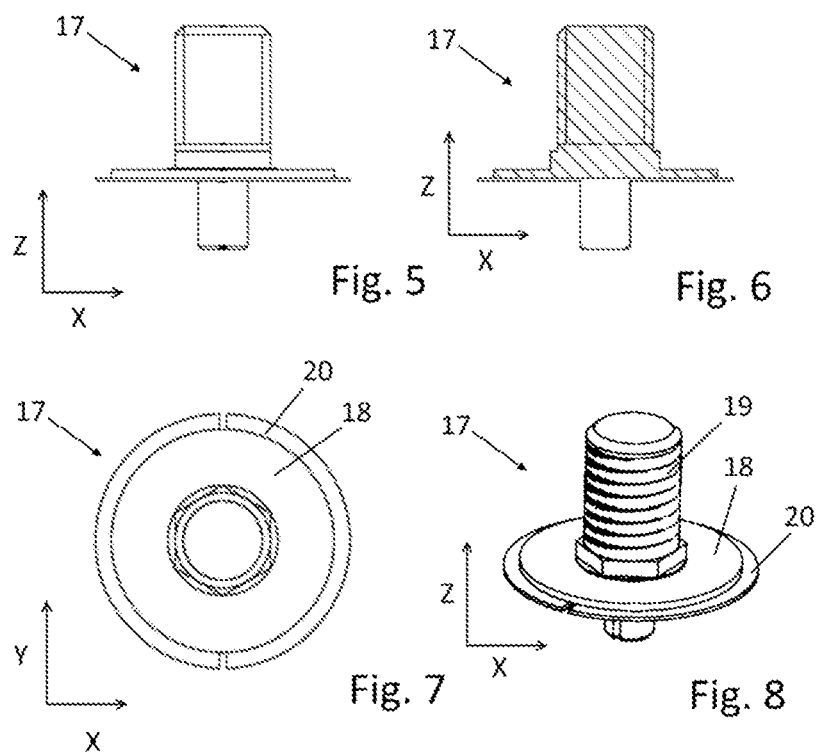

PRODUCING A RECHARGEABLE BATTERY

TECHNICAL FIELD

The system described herein relates to producing a rechargeable battery, and more particularly to producing an electrode contact of a rechargeable battery and an apparatus for producing a rechargeable battery.

BACKGROUND OF THE INVENTION

In state-of-the-art rechargeable batteries, increasingly stringent requirements are provided for the ratio between volume and capacity. This gives rise to numerous technical challenges. One of these challenges is the efficient contact connection of electrodes.

According to the prior art, metal foils are employed for this purpose, which are connected in a planar arrangement to the electrodes, i.e. the anode and cathode.

For the coupling of the rechargeable battery to a device, the rechargeable battery generally includes poles of an appropriate design. The poles are employed for the constitution of electrical contact between the rechargeable battery and the device in which the rechargeable battery is applied. To this end, the poles are required to fulfil certain geometrical requirements. Moreover, a sufficiently robust design of the poles is required, in order to also permit the frequent installation and removal of rechargeable batteries.

It will therefore be understood that, in practice, the metal foils themselves are not appropriate for use as poles. It is therefore necessary to constitute an appropriate electrical connection between the poles and the metal foil. To this end, contact elements are employed as additional components to form an electrically conductive connection between the metal foils and the poles of the rechargeable battery.

The formation of an electrically conductive connection between a contact element and a metal foil constitutes a technical challenge. According to the prior art, soldering methods are specifically employed for this purpose. Mechanical methods, such as pressing or clamping, are also known. However, these methods can result in the formation of local elements, as a result of which corrosion and/or an impairment of conductivity can occur.

Other known contact-connection methods, for example adhesive bonding by conductive adhesives and/or ultrasonic welding, can result in a loss of ductility and, in the worst case, the failure of constituent components of the rechargeable battery—potentially associated with the interruption of the current path.

DE 102 50 839 A1 discloses a method for producing a rechargeable battery in which a contact element is connected to a metal foil by a laser welding method. Lasers are employed for the bonding of the foil to the contact element. However, it has not been possible for this method to be employed in practice, specifically as due to reflections from the metal elements to be welded, unsatisfactory results have been produced in practice.

Accordingly, it is desirable to provide a method and an apparatus for producing a rechargeable battery, and a rechargeable battery, in which the above-mentioned disadvantages do not occur, or at least are attenuated.

SUMMARY OF THE INVENTION

According to the system described herein, an edge region of the metal foil is brought into contact with a first side of the contact element and, by the application of laser radiation to a second side of the contact element, which is averted from the first side of the contact element, is welded to the contact element.

Surprisingly, it has been shown that, in this manner, a reliable welded bond can be achieved between the metal foil and the contact element.

It is particularly advantageous if the contact element is made of the same material as the metal foil. By way of materials, specifically, the metals copper and/or aluminum, together with aluminum alloys and/or copper alloys, are conceivable.

Rechargeable Battery

The rechargeable battery is preferably a lithium-ion rechargeable battery. Lithium-ion rechargeable batteries permit the storage of comparatively large quantities of energy with limited weight and spatial requirements. The method according to the system described herein thus delivers a substantial added value, specifically for the production of these rechargeable batteries.

The rechargeable battery preferably assumes an at least essentially cylindrical geometry. An at least essentially cylindrical geometry is specifically to be understood as a geometry in which the main dimensions of the rechargeable battery constitute a cylindrical geometry. Individual elements of the rechargeable battery, for example the poles, can assume a design which departs from a strict cylindrical shape. Rechargeable batteries having a cylindrical geometry by way of design are already standardized, as a result of which, generally, the simpler replacement of rechargeable batteries is possible.

Preferably, the metal foils, which are specifically employed for the contact-connection of the anode and/or the cathode of the rechargeable battery, are wound together with other planar components of the rechargeable battery such as, specifically, the electrodes of the rechargeable battery, preferably in a spiral shape.

As a result of this spiral winding, the rechargeable battery assumes an at least essentially cylindrical shape. The axis of the spiral winding preferably coincides with the central axis of the cylinder. The axis is specifically to be understood as the center line of the spiral winding. A physical axis, by way of a corresponding component, may be present, but is not absolutely necessary.

Alternatively to the above-mentioned spiral winding, however, other designs of the rechargeable battery are also conceivable. Thus, the metal film can be folded, for example with further planar components of the rechargeable battery, to constitute a block. It is further advantageous if the metal foil is brought into contact with and welded to the contact element at an at least essentially 90-degree angle.

It is advantageous if the metal foil, specifically the region of the metal foil which is to be bonded to the contact element, projects in relation to the other planar or laminar constituents of the rechargeable battery such as, for example, the cathode, the anode or a further metal foil, in the direction of the contact element, preferably in the direction of the axis. It is advantageous if the metal foil projects in relation to the other laminar constituents of the rechargeable battery by at least 1 mm, preferably by at least 3 mm and/or by no more than 8 mm, preferably by no more than 6 mm. This projecting region of the metal foil permits the metal foil to be contact-connected by the method according to the system described herein, where the risk that other laminar constituents of the rechargeable battery will be impaired and/or damaged by welding is excluded, or at least reduced.

It is advantageous if one region of the metal film is bent. The bending of the region of the metal foil can appropriately be executed prior to the winding of the metal foil. A wide variety of bending methods can be employed, where a flanging method is preferred. The welding of the metal foil to the contact element is then preferably executed in the region of the bend formed. As a result, the contact surface of the metal foil with the contact element is enlarged, which impacts positively upon welding. Bending can involve, for example, bending through 180°. However, other configurations of bending are also conceivable; specifically, multiple bending can also be executed. Naturally, in this connection, the edge region which is bonded to the contact element, in the event of doubt, is not to be understood as the edge region of the original metal foil, prior to bending, but as that part of the metal foil which, further to the bending of the metal foil, constitutes the new edge of the metal foil formed by the bending of said metal foil.

In an advantageous manner, the method according to the system described herein can be employed for the electrical contact-connection of both the anode and the cathode with one metal foil respectively. The method according to the system described herein is preferably executed such that a first contact element is welded to a first metal foil, and a second contact element is welded to a second metal foil. The contact elements are advantageously situated at mutually averted ends of the rechargeable battery. As result, in the event of a—wound or folded—laminar construction of the rechargeable battery, each of the metal foils can project, both in relation to the respective other metal foil, and in relation to the further laminar constituents of the rechargeable battery, in the direction of the contact element with which the respective metal foil is connected.

The thickness of the planar contact element is preferably at least 0.05 mm, where a minimum thickness of 0.15 mm is specifically preferred, and/or preferably no more than 1.5 mm, wherein a maximum thickness of 0.6 mm is specifically preferred.

It is advantageous if the metal foil is welded onto a projecting region of the first surface of the contact element. A projecting region of this type on the contact element permits a defined local contact to be constituted between the metal foil and the contact element, at which welding is executed. The contact element thus preferably includes a recessed region, on the surface thereof which is arranged opposite the projecting region. The shape thereof is preferably configured to match the projecting region. Appropriately, the projecting region and the recessed region can be configured in combination as a beading in the contact element. This design provides an advantage, in that it can be produced in a simple manner and, as a result thereof, the thickness of the contact element in the affected region remains at least virtually constant.

The projecting region preferably projects by at least 0.1 mm, where a projection of at least 0.3 mm is specifically preferred, and/or preferably of no more than 0.8 mm, wherein a projection of no more than 0.5 mm is specifically preferred, in relation to the surrounding first surface of the contact element.

The projecting region or beading is preferably configured with a linear shape, and has a width of preferably at least 0.1 mm, wherein a width of at least 0.2 mm is specifically preferred, and/or of preferably no more than 1.5 mm, wherein a width of no more than 3 mm is specifically preferred. The projecting region preferably intersects with the metal foil in the plane in which the metal foil engages in contact with the projecting region. In a rechargeable battery of folded and/or wound design, a plurality of individual contact points are thus constituted between the edge region of the metal foil and the contact element, thereby resulting in reliable welding at these points.

The metal foil preferably has a thickness of at least 0.001 mm, wherein a thickness of least 0.05 mm is specifically preferred, and/or of preferably no more than 0.1 mm, wherein a thickness of no more than 0.02 mm is specifically preferred.

Pole Element

For the constitution of the pole of the rechargeable battery, it is advantageous if a pole element is bonded to the contact element, specifically by welding. In this manner, the geometry of the contact element, which is preferably planar or laminar, can be configured independently of the shape of the pole. This is specifically advantageous, as the shape of the pole is subject to restrictions, which are generally dependent upon the planned application of the rechargeable battery produced and/or upon technical standards.

The connection of the pole element to the contact element can be executed, for example, by means of an overlap weld or a fillet weld.

In an advantageous manner, the connection of the pole element to the contact element can be executed using the same laser as that employed for the welding of the metal foil to the contact element. This permits, for example, the welding of the metal foil to the contact element and the welding of the pole element to the contact element to be undertaken in the same apparatus, thereby simplifying of the production of the rechargeable battery.

The pole element can include, for example, a thread for the constitution of the pole of the rechargeable battery. By means of a thread of this type, the rechargeable battery can be reliably electrically connected to the apparatus which is supplied by the rechargeable battery.

It is advantageous if the pole element includes a sealing surface. The specific function of the sealing surface is to connect the pole element to an outer shell of the rechargeable battery. In this manner, a leak-tight and preferably electrically insulated rechargeable battery can be provided, where the pole elements remain accessible for the purposes of the electrical contact-connection of the rechargeable battery.

The pole element preferably overlaps—at least partially—welded joints for the connection of the metal foil to the contact element. This type of structure of the rechargeable battery can specifically be generated, in that the metal foil is firstly welded to the contact element, and the contact element is then welded to the pole element. In this manner, the pole element and, specifically, the sealing surface of the pole element, can be arranged in a region of the second surface of the contact element which is also employed for the welding of the contact element to the metal foil.

It is advantageous if the pole element, during the welding thereof to the contact element, is compressed against the contact element. It has been shown that, in this manner, the formation of gaps, which can occur between the pole element and the contact element, can be effectively prevented.

Laser

The laser is preferably a fiber laser. Fiber lasers, which are also described as fiber-optic lasers, employ the doped core of a glass fiber as an active medium. Fiber lasers provide an advantage in that, due to the potentially long length of the laser-active fiber, high amplification is possible.

The laser is preferably operated continuously, i.e. as a continuous-wave laser. In this type of operation, specifically, the laser beam is not pulsed. It has been shown that, by the continuous operation of the laser, particularly good results can be achieved with respect to welding.

Preferably, the average power, specifically the constant power of the laser during the continuous operation of said laser for the welding of the metal foil to the contact element, is at least 100 W, wherein a minimum of 200 W is specifically preferred, and/or no more than 700 W, wherein a maximum of 500 W is specifically preferred. These power ratings permit the achievement of particularly good results with respect to welding.

If the laser is also employed for the welding of the pole element to the contact element, it is appropriate that the laser power should be increased for this purpose. For the welding of the pole element to the contact element, the average power, specifically the constant power of the laser during continuous operation, is preferably at least 500 W, wherein a minimum of 700 W is specifically preferred, and/or preferably no more than 1,500 W, wherein a maximum of 1,000 W is specifically preferred.

The wavelength of the laser is preferably 1,070 nm. A laser of this wavelength permits the achievement of good results and, moreover, lasers of this wavelength are commercially available.

A single-mode laser is preferably employed. In lasers of this type, only waves in a single desired mode are amplified, whereas other modes are suppressed. In the ideal case, lasers of this type feature only a single narrow spectral line. As a result, the laser beam achieves a high optical quality, which specifically impacts upon the effective focusing capability of the laser beam.

The laser is preferably focused by means of a focusing lens. A focusing lens of this type permits the concentration of the laser beam. It has been shown that, for the method according to the system described herein, focusing lenses with a focal length of at least 10 mm, preferably at least 100 mm and/or of no more than 5,000 mm, preferably no more than 500 mm, produce particularly good results. This applies to both the welding of the metal foil to the contact element, and to the welding of the contact element to the pole element.

The laser beam employed preferably has a focal diameter of at least 1 μm, preferably at least 10 μm, and/or of no more than 500 μm, preferably no more than 50 μm. It has been shown that these focal diameters permit the achievement of a particularly effective welding of the metal foil to the contact element. This applies to both the welding of the metal foil to the contact element, and to the welding of the contact element to the pole element.

Beam Movement

The point of impact of the laser with the contact element, which is preferably the focal point of the laser beam, is preferably moved along a trajectory which results from the superimposition of a feed motion and an oscillating motion. During the welding of the contact element to the pole element, the same applies optionally to the point of contact of the laser beam with the pole element.

The feed motion is the motion by which the point of impact of the laser tracks the path of the welded joint which is to be produced. In this context, the speed at which the point of impact moves on the surface of the contact element or, optionally, of the pole element, along the welded joint, is described as the rate of feed. The rate of feed is preferably at least 10 mm/s, preferably at least 70 mm/s, and/or no more than 200 mm/s, preferably no more than 150 mm/s. It has been shown that these rates of feed permit a comparatively rapid production of welded joints, with a simultaneously high quality. It is understood that—in the event of a superimposition of the oscillating motion upon the feed motion—an average speed of motion in the feed direction is to be considered as the rate of feed, rather than the absolute speed of the resulting motion in the feed direction.

The oscillating motion, upon which the feed motion is preferably superimposed, preferably assumes a frequency of at least 100 Hz, preferably at least 500 Hz, and/or of no more than 5,000 Hz, preferably no more than 1,500 Hz. The amplitude of the oscillating motion is preferably at least 0.02 mm, preferably at least 0.1 mm, and/or no more than 0.5 mm, preferably no more than 1 mm. It has been shown that a localized power modulation can be achieved, which permits a particularly effective control of the weld pool.

This can preferably be a circular oscillating motion. In this case, the radius of the circle described by the oscillating motion corresponds to the amplitude, with respect to the above-mentioned values. In the event of more complex oscillating motions such as, for example, an elliptical oscillating motion, the corresponding amplitude considered is an average amplitude.

Apparatus

The apparatus according to the system described herein is specifically employed for the production of a rechargeable battery according to the above-mentioned method. To this end, the apparatus includes a fixing device for the fixing of a contact element. The fixing of the contact element is advantageous, as the accurate positioning of the contact element impacts advantageously upon the focusing of the laser beam.

The apparatus further includes an accommodating device for the accommodation of an arrangement that includes a metal foil and further constituents of the rechargeable battery. According to the system described herein, the apparatus is configured to bring an edge region of the metal foil into contact with a first surface of the contact element. The contact element is thus oriented at right angles to the metal foil.

By means of an apparatus thus configured, the arrangement, which can include, for example, a cylindrical winding constituted from planar constituents of the rechargeable battery, can be accurately positioned relative to the contact element, and brought into contact with the latter.

According to the system described herein, the apparatus includes a laser, which is employed for the welding of the metal foil to the contact element. The apparatus is designed to apply the laser to a second surface of the contact element, which is averted from the first surface.

According to an advantageous further development, the apparatus according to the system described herein further includes a tensioning device, by means of which a pole element can be braced against the contact element. A device of this type permits a pole element to be welded to the contact element where, by means of tensioning, any potential formation of a gap between the pole element and the contact element can be prevented. The laser can preferably be employed both for the welding of the metal foil to the contact element and for the welding of the pole element to the contact element.

BRIEF DESCRIPTION OF THE DRAWINGS

The system described herein is set forth in greater detail hereinafter with reference to the several figures of the drawings, noted as follows:

FIG. 5 shows a side view of a pole element according to the system described herein.

FIG. 6 shows a sectional representation of the pole element according to the system described herein.

FIG. 7 shows an overhead view of the pole element according to the system described herein.

FIG. 8 shows a perspective representation of the pole element according to the system described herein.

DETAILED DESCRIPTION OF VARIOUS EMBODIMENTS

Figure 1:
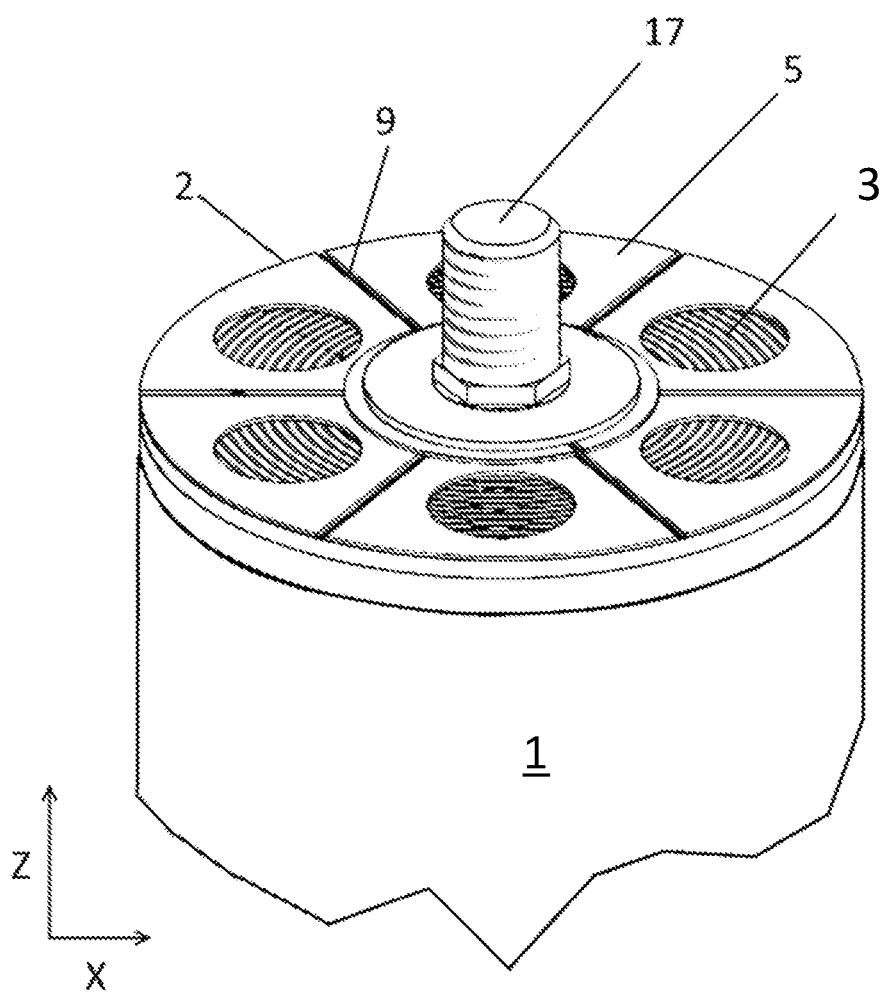
FIG. 1 shows a schematic perspective representation of part of a rechargeable battery, produced according to the system described herein.
Figure 3:
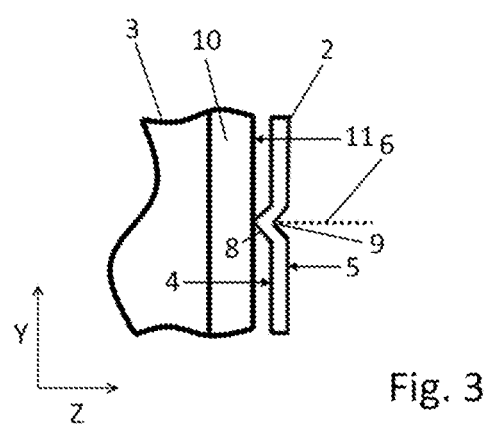
FIG. 3 shows a detailed representation of a weld of the metal foil to the contact element, according to the system described herein.

A rechargeable battery 1 according to the system described herein includes a contact element 2, which is welded to a metal foil 3. For the production of the rechargeable battery 1 represented in FIG. 1, FIG. 3 shows that an edge region of the metal foil 3 is brought into contact with a first surface 4 of the contact element 2. By the application of a laser beam 6 to a second surface 5 of the contact element 2, which is averted from the first surface 4 of the contact element 2, the contact element 2 is welded to the metal foil 3.

In an embodiment described herein, the metal foil 3 is wound with further planar constituents of the rechargeable battery, specifically the electrodes, to constitute a spiral winding. This produces a rechargeable battery of cylindrical design. In the example represented, the metal foil 3 is arranged at right angles to the first surface 4 of the contact element 2.

According to an advantageous form of an embodiment, the contact element 2, in the example represented, includes an opening 7, and possibly a plurality of openings 7.

As represented in FIG. 3, the first surface 4 of the contact element 2, in the example represented, includes a plurality of projecting regions 8. The projecting regions 8 are advantageously configured as beadings 9. The metal foil 3 and the projecting regions 8, in an advantageous manner, are mutually oriented such that the metal foil 3 and the projecting regions 8 intersect.

In the example represented, the contact element 2 has a thickness of 0.3 mm. The projecting regions 8 project by 0.4 mm in relation to the first surface 4.

In the example represented, the metal foil 3 includes a bent region 10. The metal foil 3, in the region of the bend 11, engages with the projecting region 9 of the first surface 4 of the contact element 2. The thickness of the metal foil 3 is preferably 0.01 mm.

Figure 2:
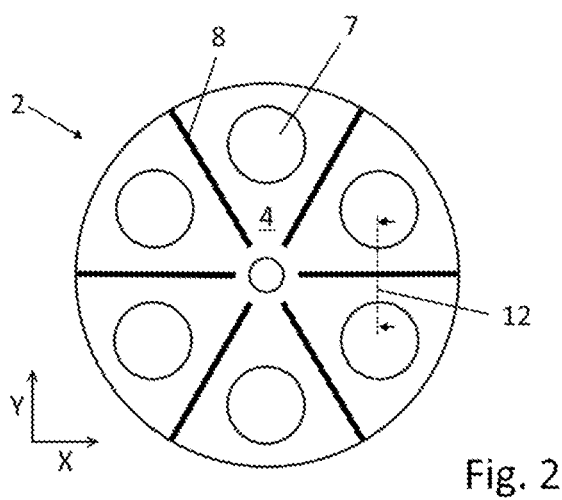
FIG. 2 shows a schematic representation of a contact element, in an overhead view, according to the system described herein.

In the interests of clarity, a section line 12 corresponding to FIG. 3 is shown in FIG. 2.

Figure 4:
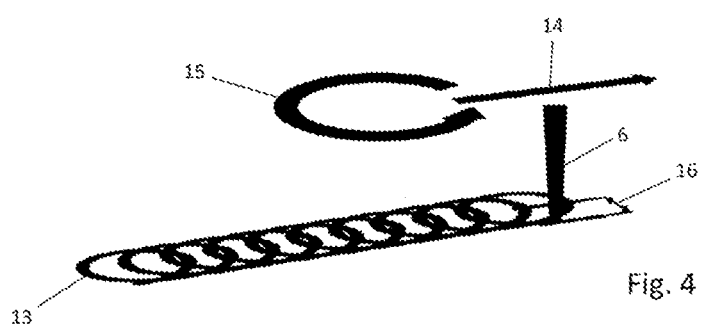
FIG. 4 shows a schematic representation of a trajectory of the laser during welding according to the system described herein.

In an embodiments of the method according to the system described herein, the metal foil 4 and the contact element 2 are welded in each case using a single-mode fiber laser with a wavelength of 1,070 nm. A trajectory 13 of the laser beam represented schematically in FIG. 4 is produced by the superimposition of a feed motion 14 and a circular oscillating motion 15.

1$^{st}$ Embodiment

According to a first embodiment, the laser power of the continuously operated laser is 300 W. The speed of the feed motion 14 is 100 mm/s. The frequency of the oscillating motion 15 is 1,000 Hz. The amplitude 16 of the oscillating motion 15 is 0.2 mm. The material of the contact element 2 and the metal foil 3 is copper. The focusing lens employed has a focal length of 160 mm, and the focal diameter is 14 μm.

2$^{nd}$ Embodiment

According to a second embodiment, the laser power of the continuously operated laser is 300 W. The speed of the feed motion 14 is 120 mm/s. The frequency of the oscillating motion 15 is 1,000 Hz. The amplitude 16 of the oscillating motion 15 is 0.3 mm. The material of the contact element 2 and the metal foil 3 is aluminum. The focusing lens employed has a focal length of 160 mm, and the focal diameter is 14 μm.

3$^{rd}$ Embodiment

According to a third embodiment, the laser power of the continuously operated laser is 400 W. The speed of the feed motion 14 is 110 mm/s. The frequency of the oscillating motion 15 is 1,000 Hz. The amplitude 16 of the oscillating motion 15 is 0.3 mm. The material of the contact element 2 and the metal foil 3 is copper. The focusing lens employed has a focal length of 330 mm, and the focal diameter is 29 μm.

4$^{th}$ Embodiment

According to a fourth exemplary embodiment, the laser power of the continuously operated laser is 300 W. The speed of the feed motion 14 is 110 mm/s. The frequency of the oscillating motion 15 is 1,000 Hz. The amplitude 16 of the oscillating motion 15 is 0.3 mm. The material of the contact element 2 and the metal foil 3 is aluminum. The focusing lens employed has a focal length of 330 mm, and the focal diameter is 29 μm.

In an advantageous manner, the laser, in the context of the method according to the system described herein, can also be employed for the welding of a pole element 17 to the contact element 2. In the example represented, the pole element 17 includes a sealing surface 18. The function thereof is to provide a pole of the rechargeable battery 1 which, in the example represented, appropriately includes a thread 19. As can specifically be seen from a comparison of FIG. 1 and FIG. 2, the pole element 17, at its sealing surface 18, partially overlaps the beadings 9, along which the welded joints between the contact element 2 and the metal foil 3 are executed.

The welding of the pole element 17 can be executed, for example, in the region of a connection region 20 of the pole element. In the example represented, the connection region 20 surrounds the sealing surface 18.

Appropriately, for the welding of the pole element 17 to the contact element 2, the laser power is increased, for example, to 800 W. In the embodiment shown, the focusing lens employed has a focal length of 330 mm. The feed motion 14 of the laser beam, in the welding of the pole element, is also superimposed by an oscillating motion 15. The frequency of the circular oscillating motion is, for example, 800 Hz, and the amplitude is 0.2 mm. The rate of feed can be, for example, 100 mm/s. In the example represented, the pole element 17, in an advantageous manner, is constituted of the same material as the contact element 2, preferably of copper or aluminum.

The invention claimed is:

1. A method for producing a rechargeable battery, comprising:
   coupling an edge region of a metal foil with a first surface of contact element of a contact-connection of an electrode of the rechargeable battery; and
   welding the contact element to the metal foil by applying a laser beam to a second, opposing, surface of the contact element using a feed motion of the laser beam that is superimposed by an oscillating motion.

2. The method as claimed in claim 1, wherein the metal foil and further planar constituents of the rechargeable battery are wound to provide the rechargeable battery with an at least essentially cylindrical design, wherein the metal foil is brought into contact with, and welded to the first surface of the contact element, which is oriented at right angles to the metal foil.

3. The method as claimed in claim 1, wherein a region of the metal foil is bent prior to winding.

4. The method as claimed in claim 3, wherein the metal foil is bent through 180° in a region of the bend.

5. The method as claimed in claim 1, wherein a region of the metal foil which is to be bonded to the contact element protrudes, in relation to other laminar constituents of the rechargeable battery in a direction of the contact element by at least 1 mm and by no more than 8 mm.

6. The method as claimed in claim 1, wherein the metal foil is welded to a projecting region of the first surface of the contact element.

7. The method as claimed in claim 1, wherein a pole element is welded to the contact element.

8. The method as claimed in claim 7, wherein the pole element includes a sealing surface and wherein welded joints for connection of the metal foil to the contact element are at least partially overlapped by the sealing surface of the pole element.

9. The method as claimed in claim 7, wherein the pole element is welded to the contact element using the same laser.

10. The method as claimed in claim 7, wherein the metal foil is one of: copper or a copper alloy.

11. The method as claimed in claim 1, wherein a single-mode fiber optic laser having a wavelength of 1,070 nm, is employed.

12. The method as claimed in claim 11, wherein the laser is operated as a continuous-wave laser having a power of at least 100 W.

13. The method as claimed in claim 11, wherein the laser is focused using a focusing lens having a focal length of at least 10 mm.

14. The method as claimed in claim 11, wherein the laser has a beam with a focal diameter of at least 1 μm.

15. The method as claimed in claim 14, wherein a rate of feed of the laser beam along a welded joint produced is at least 10 mm/s.

16. The method as claimed in claim 15, wherein the oscillating motion has a frequency of at least 100 Hz and an amplitude of at least 0.02 mm.

17. The method as claimed in claim 1, wherein the oscillating motion has an amplitude of at least 0.1 mm.

18. The method as claimed in claim 1, wherein the oscillating motion has an amplitude of at least 0.5 mm.

* * * * *